US011316269B2

(12) United States Patent
Szczepanik et al.

(10) Patent No.: US 11,316,269 B2
(45) Date of Patent: Apr. 26, 2022

(54) METHOD OF PROVIDING TIME ALIGNMENT BETWEEN PHASED ARRAYS FOR COMBINED OPERATION

(71) Applicant: HANWHA PHASOR LTD., London (GB)

(72) Inventors: John-Paul Szczepanik, Ledbury (GB); Philip Schryber, Ledbury (GB)

(73) Assignee: HANWHA PHASOR LTD., London (GB)

( * ) Notice: Subject to any disclaimer, the term of this patent is extended or adjusted under 35 U.S.C. 154(b) by 0 days.

(21) Appl. No.: 16/978,136

(22) PCT Filed: Mar. 7, 2019

(86) PCT No.: PCT/GB2019/050642
§ 371 (c)(1),
(2) Date: Sep. 3, 2020

(87) PCT Pub. No.: WO2019/171066
PCT Pub. Date: Sep. 12, 2019

(65) Prior Publication Data
US 2021/0005964 A1    Jan. 7, 2021

(30) Foreign Application Priority Data
Mar. 7, 2018  (GB) .................................. 1803660

(51) Int. Cl.
*H01Q 3/26*     (2006.01)
*H04L 1/00*     (2006.01)
*H04B 1/04*     (2006.01)

(52) U.S. Cl.
CPC ......... *H01Q 3/2694* (2013.01); *H04B 1/0475* (2013.01); *H04L 1/0035* (2013.01)

(58) Field of Classification Search
CPC ... H01Q 3/2694; H04B 1/0475; H04L 1/0035
See application file for complete search history.

(56) References Cited

U.S. PATENT DOCUMENTS 5,041,836 A      8/1991   Paschen et al.
2002/0135513 A1  9/2002   Paschen et al.
(Continued)

FOREIGN PATENT DOCUMENTS

CN     104090267 B    6/2016
EP       1281213 B1   2/2003

OTHER PUBLICATIONS

International Search Report and Written Opinion, PCT/GB2019/050642, dated May 14, 2019, 21 pages.
(Continued)

*Primary Examiner* — Janice N Tieu
(74) *Attorney, Agent, or Firm* — Nelson Mullins Riley & Scarborough LLP

(57) ABSTRACT

A method of creating a timed array from a plurality of phased arrays is provided. The method comprises the steps of: phase steering each phased array to a desired pointing; applying processing to signals received from at least one of the phased arrays, wherein applying processing to the signals comprises applying, based on a reference, an adjustment to the signals from at least one of the phased arrays, such that the processed signals are substantially aligned in time with the reference; and combining the processed signals from each of the phased arrays; wherein the adjustment varies based at least in part on the desired pointing and the relative location of the phased arrays.

10 Claims, 2 Drawing Sheets

(56) References Cited

U.S. PATENT DOCUMENTS

| | | | |
|---|---|---|---|
| 2007/0135168 A1* | 6/2007 | Liu | H04B 7/0617 455/562.1 |
| 2010/0222005 A1 | 9/2010 | Jacomb-Hood | |
| 2014/0077996 A1 | 3/2014 | Mayo | |
| 2014/0301494 A1 | 10/2014 | Hsu et al. | |
| 2018/0003826 A1 | 1/2018 | Lacaze et al. | |

OTHER PUBLICATIONS

United Kingdom Search and Examination Report, GB1803660.8, dated Aug. 22, 2018, 8 pages.

* cited by examiner

METHOD OF PROVIDING TIME ALIGNMENT BETWEEN PHASED ARRAYS FOR COMBINED OPERATION

This Application is the National Stage of International Application No. PCT/GB2019/050642 filed on Mar. 7, 2019, which claims priority from Application No. 1803660.8 filed on Mar. 7, 2018 in the United Kingdom. The entire contents of these applications are incorporated herein by reference in their entirety.

TECHNICAL FIELD

The present invention relates to phased arrays and, in particular, to improvements in very large phased arrays.

BACKGROUND

There is a need, for example in some maritime applications, for very large communications dishes. For example a dish with a 2.4 m diameter is not uncommon. Within these applications, there is also a desire for considerable bandwidth, for example in excess of 100 MHz.

In order to improve communications capability in these applications, there is a desire to move to the deployment of phased arrays. However, when a phased array exceeds a predetermined threshold size, the effect of smearing across the array results in having to limit the bandwidth used to avoid inter-symbol interference and consequently high data error rate.

This problem has been solved in other applications, by the provision of sufficiently small phased arrays that the effect of smearing is not sufficient to disrupt the functioning of the array. Such applications include commercial telecommunications and satellite communications with LEO satellites.

However, simply providing small phased arrays to avoid the problem of smearing does not overcome the problem itself and therefore new solutions are required in order to provide the large phased arrays desired in some maritime applications including luxury cruise ships which move across the oceans and require reliable access to large bandwidths.

Within the context of the present invention, a timed array is defined in line with the definition set out in Randy L Haupt's "Timed Arrays—Wideband and Time varying antenna arrays", published by IEEE. In summary Section 1 of this publication briefly introduces antenna arrays and the difference between phased and timed arrays. Not long after the invention of antenna arrays, researchers experimented with moving the main beam by modifying the phase of the signals fed at the elements. Manual beam-steering eventually led to the invention of the phased array where the main beam was electronically steered to a desired direction by applying a pre-calculated phase offsets to all the elements. Phase is a narrow band concept, though. Today's applications of antenna arrays require high data rates and wide bandwidths. The term "timed arrays" applies to several classes of antenna arrays that are becoming more important with the development of new technologies that must be designed, analyzed, and tested in the time domain, rather than the steady-state, time harmonic forms used with phased arrays. Timed arrays have been defined as "timed-domain equivalent of phased arrays".

Further relevant commentary indicative of the understanding of the skilled man is found in Section 7 of the same publication wherein it is stated that the distinction between phase shift and time delay becomes very important when considering wideband signals. A single tone represented by a sinusoid having constant time delay and phase shift terms in the argument. Phase shift and time delay are constants in the cosine argument. The phase shift is bound, while the time delay has no bounds. When dealing with only one frequency (narrow band), phase shift and time delay are identical. The phase shift associated with time delay ($2 \pi fT d$) is a linear function of frequency and has a constant Fourier transform with respect to frequency. By contrast, the Fourier transform of a signal time delay is a linear function of frequency. Time delay is also known, in some contexts, as group delay (envelope delay). In this context, it is a measure of component phase distortion, the signal transit time through a component as a function of frequency, the negative of the rate of change of phase through a component.

Phased arrays use phase shifters to electronically steer the main beam at the carrier frequency. Narrow band signals can be approximated by the carrier frequency to within reasonable accuracy. In broadband signals, however, the signal envelope has frequency components extending far from the carrier. Large, wideband phased arrays distort signals due to beam squint and pulse dispersion. The phase shift that steers the main beam to ($\theta s, \phi s$) at the centre frequency steers the main beam to an offset location at a different frequency. Main beam pointing error that is a function of frequency is known as beam squint and is proportional to the size of the phased array.

Pulse dispersion occurs when signals do not arrive at all the elements at the same time, because they are incident from an off-broadside angle. Phase shifters align these signals in phase but not in time. As a result, adding the phase-shifted element signals together at the array output causes the pulses to coherently add but also causes pulse spreading in time. Time delay uses some of the same technology as phase shifters, but time delay units are more complex and often bigger.

WO2010/007442 describes a method of operating a phased array and being able to extract a phase control signal from such a system. This phase control signal can be used to measure and track certain aspects of the signal being received.

BRIEF DESCRIPTION OF THE DRAWINGS

The present invention will now be described, by way of example only, with reference to the accompanying drawings in which.

DETAILED DESCRIPTION

Figure 1:
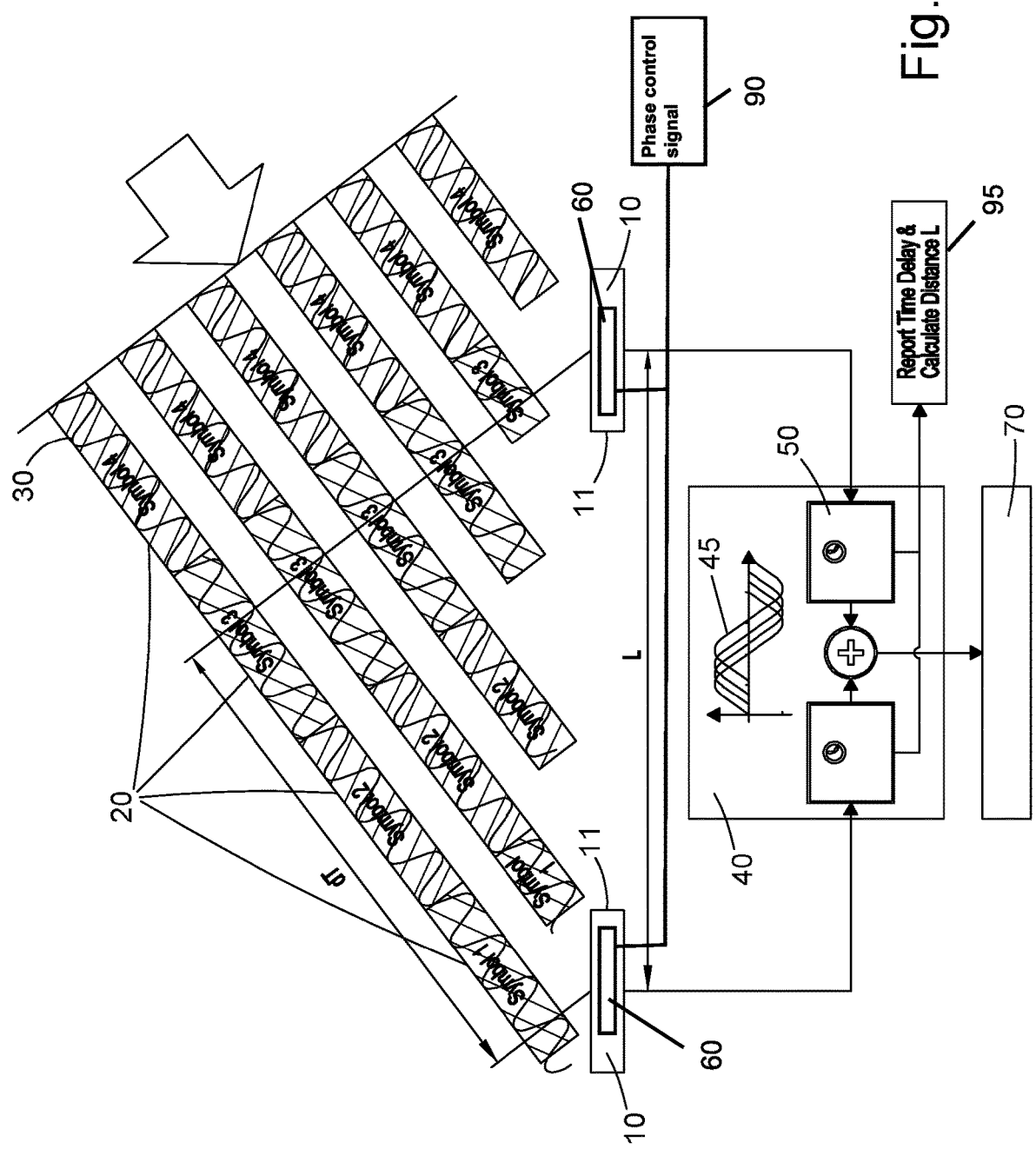
FIG. 1 shows a received signal on a distributed aperture.

According to the present invention there is therefore provided a method of creating a timed array from a plurality of phased arrays, the method comprising the steps of: phase steering each phased array to a desired pointing; applying processing to signals received from at least one of the phased arrays in order to create time alignment between the plurality of phased arrays; and combining the processed signals from each of the phased arrays.

The ability to steer each phased array to a desired pointing enables the timed array to be created on a moving platform such as a cruise ship. The phase steering of the phased arrays is continuous as the ship, or other platform on which the array is mounted, moves across the earth's surface and therefore moves relative to the source of the signals.

The processing of the signals is applied to at least one of the phased arrays, so that, when the signals from each of the phased arrays are combined, the effect of smearing is reduced, or even eliminated. It will be understood that it is not necessary to apply the processing to the signals from all of the phased arrays as at least one of the phased arrays may be designated as the master and the signals from each of the other phased arrays may be processed to align with the master array. Alternatively, the signals from all of the phased arrays may be processed to align with a consensus signal which represents the mean of all of the signals.

When limits are imposed on steering angles in order to minimise smearing for a given bandwidth, the steering angle of the full timed array will exceed the steering angle obtainable from a phased array with the same size aperture. This enables the multiple phased arrays to be combined to mimic the response of an array larger while also maintaining the required maximum steering angles.

The phased arrays may be contiguous or distributed. The distributed phased arrays may be deployed on a fleet of vehicles which move predominantly together, although not actually physically linked to one another. The ability to steer each phased array and to process their respective signals, enables the combined response to be independent of the relative positions of the phased arrays, which may change over time.

The step of applying processing to signals requires no a priori knowledge of the temporal difference between the signals received from each of the phased arrays. This is especially relevant to applications in which the phased arrays are distributed and there is relative motion between the different phased arrays.

The step of applying processing may include correlating the information within each signal to the information in the each of the signals from each of the plurality of phased arrays. In particular, the step of applying processing may include correlating to a predefined code embedded in each signal. The signal may include a packet of information that is used in the method to align the signals. However, if this data packet is not provided, then the processing can still take place.

The time alignment may be achieved by digital processing.

The digital processing may include representing each of the signals from each phased array as a uniform series of digital samples which can be delayed by a predetermined number of samples with respect to one another. In particular, the signals from each of the phased arrays may be formed into a series of digital samples and the digital processing may include representing each of the signals from each phase array as a uniform series of signal samples which can be delayed by a fraction of a sample time with respect to one another.

An important part of a timed array is the ability to control the alignment of the carrier signal from each of the transmitting elements. This control needs to be very accurate and much better than the period of the carrier signal. Without this control it is not possible to ensure that the signals from each of the transmitting elements combine constructively in the direction of the receiving antenna (for example the satellite). This alignment has to take into account both the direction of the receiver and also the relative position and relative movement of the transmitting elements. This alignment is the same as tracking, and then compensating for, the change in path length between each transmitting element and the receiving antenna such that the signals are fully aligned when reaching the receiver.

For example, with a carrier signal of 14 GHz the period of this signal is $71 \times 10^{-12}$ seconds (71 ps) and the wavelength of the signal is approximately 21 mm. This alignment is very hard when done completely in the time domain. Instead it can be broken into two parts. The first is a gross time alignment to the order of the signal bandwidth frequency or symbol frequency. For example this frequency might be 100 MHz, and so a period of 10 ns and therefore achievable with standard and inexpensive electronics. The second step is the fine alignment which is instead done as a phase shift of the carrier frequency.

From the phase control signal produced by each phased array it is possible to calculate the change in path length ($\Delta P$), between the transmitter and the receiver, from the change in phase in the received signal relative to the local oscillator.

When this method is used on one or more phased arrays at once, where each of these phased arrays are fed with a common reference signal to which its own local oscillator signal is phase locked, the change in path length ($\Delta P$) from each of these phased arrays can be collated and compared. Once in possession of the change in path length ($\Delta P$) for each element in the timed array, it is possible to apply step two mentioned above, to calculate and then apply a single phase shift to each of the phased arrays so that the transmitting signals are phase aligned in the direction of the receiver.

Without this method of using the receive part of the phased array and measuring the change in path length for each element in the timed array, it would be near impossible to correct for the relative position and small relative movements between each of the phased arrays (which result in an unknown change in the path length and hence phase alignment) in this timed array.

FIG. 1 shows a wave front W incident on two phased arrays 10 forming a distributed aperture 11. It will be appreciated that there may be more phased arrays 10 forming the distributed aperture, but only two are illustrated in order to simplify the illustration of the concept. It will also be appreciated that although the two phased arrays 10 are illustrated as spatially separated entities, they could be adjacent to one another in which case the distance L is the centre to centre distance. Alternatively, the arrays 10 could be adjacent, but angled relative to one another. This is applicable to applications where the arrays are positioned on the outer surface of a complex object such as a yacht, cruise ship, plane or tank. There may be relative movement between the phased arrays 10 and the source of the wave front W received. The wave front W may be received from a geostationary satellite by a moving object, such as a yacht, cruise ship, plane or tank. Alternatively, the phased arrays 10 may be provided on a building or land mass, but be configured to receive data from LEO satellites which move relative to the earth's surface. In each application there is relative movement between the signal source and the phased array receiving the wave front W.

The wave front W comprises a series of symbols 20, in the illustrated example four symbols 20 are shown. These symbols 20 are superposed on a carrier 30, which is illustrated as the sinusoidal waveform that underlies the symbols 20. In this example the symbols are provided at a frequency of 100 MHz or higher and the carrier frequency is in the region of 14 GHz.

The phased arrays 10 sample the incoming wave front W. The sampling rate is typically between twice and four times the symbol rate. The sampling rate is therefore between 250 MHz and 500 MHz. The data from the sampling is then converted from analogue to digital within the phased array 10 and then forwarded to a central processing location 40.

The effect of the distance L between the phased arrays 10 is smearing of the signal. As the phased array 10 on the left of the illustration receives symbol 1, the phased array 10 on the right of the illustration has already received symbols 1, 2 and 3 and is receiving symbol 4.

The data received from the phased arrays 10 at the central processing location 40 is illustrated graphically at 45. This shows the overlaying of four distinct inputs, smeared in time (horizontal axis) as a result of the spatial separation of the phased arrays 10 from which the data has been received.

In some embodiments the central processing location 40 includes a sampling clock which is distributed back to each of the phased arrays 10 in order to enable the different phased arrays to synchronise their sampling of the received data.

In some embodiments, the timing of the sampling is derived from a clock signal that is received from outside the system. For example, a GPS clock signal, accessible to all phased arrays 10 can be used to provide a clock signal to which each phased array 10 can synchronise its sampling.

The alignment of the received signals takes place in the central processing location 40 in two steps. Firstly, there is a coarse, or symbol level, alignment. This is achieved through providing a time delay 50 to the outputs from one or more of the phased arrays. In some embodiments, the output from one of the phased arrays is unchanged and all of the outputs from the other phased arrays are time delayed to match the first output. In some embodiments, the output of each of the phased arrays is brought into line with a consensus signal which is obtained as a calculation of the average of all of the outputs.

Once this has been completed, the phase is aligned to fine tune the alignment between the signals received from each of the phased arrays 10 by the application of a phase delay 60 to at least the output from one of the phased arrays. The phase of the output from one or more of the phased arrays is altered until the signals from the respective phased arrays constructively interfere to provide the maximum amplitude of combined signal. This combined signal can then be output from the central processing location 40 to a modem 70. The modem may be L-band or digital.

In an alternative embodiment, the sampled data is transferred directly to the central processing location 40 and the analogue to digital conversion is carried out centrally. Although this embodiment requires only a central analogue to digital converter, there is a risk of signal degradation in the data transfer from the phased arrays 10 to the central processing location 40.

Figure 2:
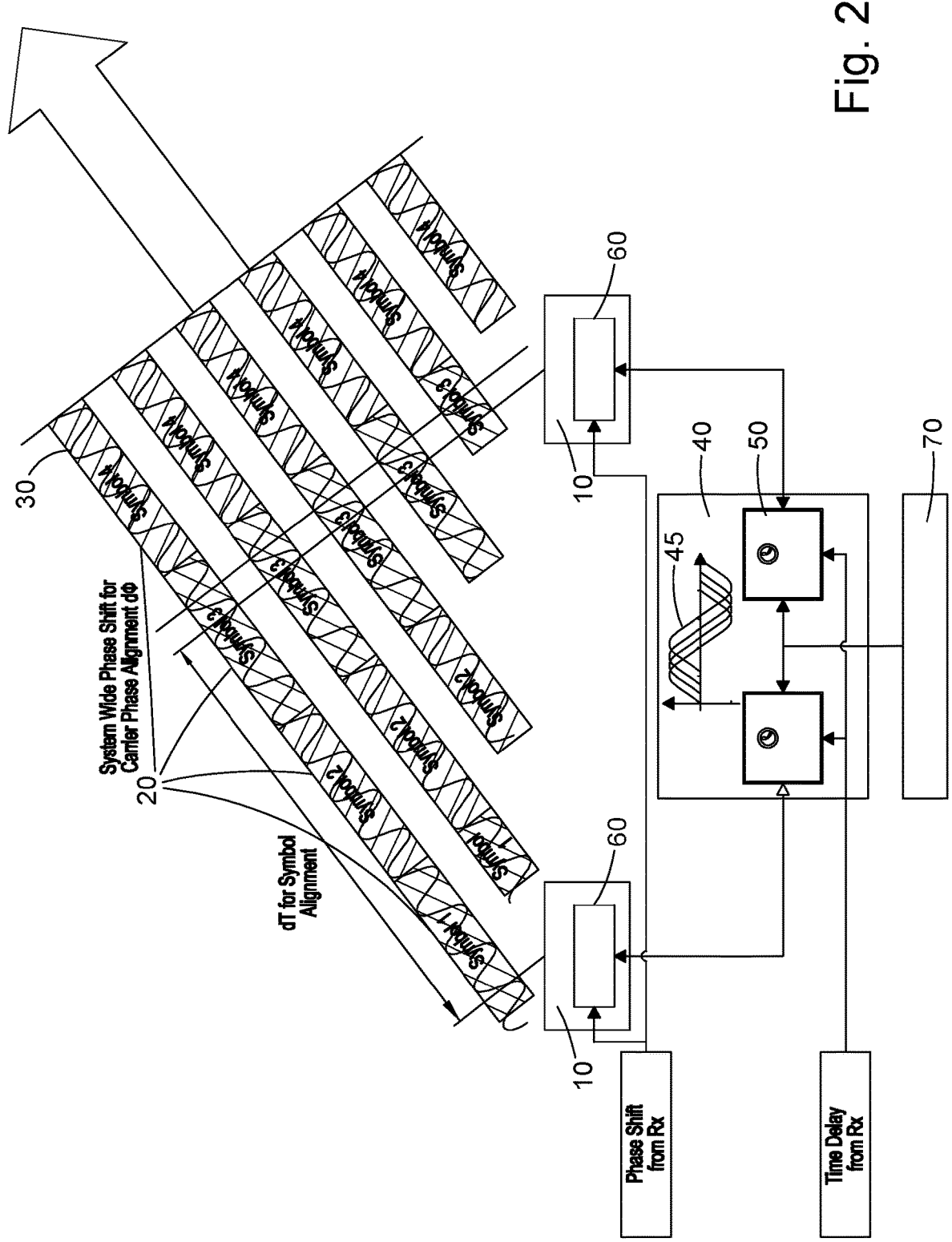
FIG. 2 shows a transmitted signal from a distributed aperture.

FIG. 2 shows a wave front W emanating from two phased arrays 10 forming a distributed aperture 11. The data 95 from the received wave front W shown in FIG. 1 informs the selection of time delay applied in the central processing location 40. The phase delay 90 is applied locally at each phased array 10 in order to create a fully synchronised signal for transmission.

The invention claimed is:

1. A method of operating a timed array from a plurality of phased arrays, the method comprising:
    phase steering each phased array to a desired direction;
    applying processing to signals received from at least one of the phased arrays, wherein:
        the signals have a signal bandwidth frequency, a symbol frequency, and a carrier frequency, and
    applying processing to the signals comprises applying, based on a reference, an adjustment to the signals from at least one of the phased arrays; and
    combining the processed signals from each of the phased arrays,
    wherein:
        the adjustment varies based at least in part on the desired direction and relative location of the phased arrays, and
        applying the adjustment comprises:
            a gross time alignment to the order of the signal bandwidth frequency or the symbol frequency; and
            a fine alignment as a phase shift of the carrier frequency.

2. The method according to claim 1, wherein the adjustment comprises a time delay and a phase adjustment.

3. The method according to claim 2, wherein the time delay and/or the phased adjustment are obtained from the processing of signal received from the phased arrays.

4. The method according to claim 1, wherein the phased arrays are contiguous.

5. The method according to claim 1, wherein the phased arrays are distributed.

6. The method according to claim 1, wherein applying processing to the signals requires no a priori knowledge of temporal differences between the signals received from each of the phased arrays.

7. The method according to claim 1, wherein applying processing to the signals includes correlating information within each signal to information in the each of the signals from each of the plurality of phased arrays.

8. The method according to claim 1, wherein the gross time alignment is achieved by digital processing.

9. The method according to claim 8, wherein the signals from each of the phased arrays are formed into a series of digital samples.

10. The method according to claim 9, wherein the digital processing includes representing each of the signals from each phased array as a uniform series of digital samples.

* * * * *